United States Patent
Hanamoto et al.

(10) Patent No.: US 6,925,044 B2
(45) Date of Patent: Aug. 2, 2005

(54) RECORDING CONTROL METHOD FOR OPTICAL DISK RECORDING AND REPRODUCING APPARATUS

(75) Inventors: Yasushi Hanamoto, Hanyu (JP); Toru Tanaka, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 497 days.

(21) Appl. No.: 10/230,760

(22) Filed: Aug. 28, 2002

(65) Prior Publication Data

US 2003/0058761 A1 Mar. 27, 2003

(30) Foreign Application Priority Data

Sep. 26, 2001 (JP) .................................. 2001-293492

(51) Int. Cl.⁷ .............................................. G11B 7/00
(52) U.S. Cl. .................... 369/53.36; 369/47.32
(58) Field of Search ...................... 369/30.24, 30.36, 369/44.31, 47.3, 47.32, 47.44, 53.31, 53.35, 53.36

(56) References Cited

U.S. PATENT DOCUMENTS

| | | | | |
|---|---|---|---|---|
| 5,212,678 A | * | 5/1993 | Roth et al. | 369/47.33 |
| 5,420,839 A | * | 5/1995 | Tateishi | 369/30.25 |
| 5,802,026 A | * | 9/1998 | Tsukihashi | 369/47.29 |
| 5,831,946 A | * | 11/1998 | De Bie | 369/30.36 |
| 6,388,961 B1 | * | 5/2002 | Ijichi | 369/30.36 |
| 6,757,229 B2 | * | 6/2004 | Izawa | 369/47.33 |
| 6,775,211 B1 | * | 8/2004 | Tsukihashi | 369/47.28 |

* cited by examiner

Primary Examiner—Thang V. Phan
Assistant Examiner—Bach Vuong
(74) Attorney, Agent, or Firm—Hogan & Hartson, LLP

(57) ABSTRACT

When during the operation of recording a signal onto a disk the amount of signal data stored in a buffer RAM for temporarily storing a recording signal falls below an interruption set value, the recording operation on the disk is interrupted. Subsequently, when the amount of signal data stored in the buffer RAM increases to a resumption set value, a signal recorded on the disk before the interruption is reproduced. On the basis of the reproduced signal, the recording operation is resumed from a position where the recording is interrupted. The operation of resuming recording that is interrupted due to a shock is permitted. The operation of resuming recording after the interruption of the recording is started from a position that is before the position where the recording is interrupted.

6 Claims, 2 Drawing Sheets

RECORDING CONTROL METHOD FOR OPTICAL DISK RECORDING AND REPRODUCING APPARATUS

BACKGROUND OF THE INVENTION

1. Field of the Invention

The present invention relates to an optical disk recording and reproducing apparatus for recording a signal on a disk using light beams emitted from a laser diode built in an optical pickup and for reproducing a signal recorded on the disk using the light beams.

2. Description of the Related Art

Disk players which use an optical pickup to read out signals recorded on a disk have become very popular. In more recent years, optical disk recording and reproducing apparatuses have become commercialized. In addition to a playback function, such an optical disk recording and reproducing apparatus can record a signal on a disk using light beams emitted from a laser diode built into an optical pickup.

A typical optical disk recording and reproducing apparatus is constructed so that the operation of recording a signal is performed in accordance with a recording instruction supplied from a computer system serving as a host device. In the recording operation, a signal to be recorded on the disk is temporarily stored in a buffer RAM and the signal stored in the buffer RAM is read out to perform the signal recording operation.

As long as the operation of recording a signal on the disk is performed normally, the operation of writing a recording signal generated from the computer system in the buffer RAM, the operation of reading the signal from the buffer RAM, and the operation of recording the read-out signal on the disk are performed in accordance with the amount of recording signal data and the recording situation in the disk.

During the signal recording operation, when the amount of recording signal data stored in the buffer RAM is insufficient, the operation of recording signals on the disk cannot be performed, namely, a situation called buffer underrun occurs. As a method for solving the above problem, the following technology is developed. That is, when the amount of recording signal data stored in the buffer RAM passes below a predetermined value, referred to as an interruption set value, the recording operation in the disk is temporarily halted, and, when the amount of recording signal data stored in the buffer RAM is again larger than the predetermined value, now a resumption set value, the recording operation in the disk is resumed.

As a method for dealing with the problem regarding buffer underrun, there is a method for performing the operation of interrupting recording and the operation of resuming the recording. In the recording resuming operation, a signal recorded on the disk before interruption of the recording is reproduced, a reference signal included in the reproduced signal is synchronized with a recording reference signal, and the recording operation is resumed upon synchronization. However, the recording operation is not resumed immediately after the synchronization of the reference signal with the recording reference signal. When the number of frames constituting the recording signal reaches a predetermined number after the synchronization, the recording operation is resumed.

The technology of performing the above-mentioned recording interrupting and resuming operation is developed in order to prevent buffer underrun. It is considered that the technology is utilized in situations wherein the recording operation is unexpectedly interrupted due to an applied external force.

In the recording interrupting and resuming operation which is performed in order to prevent the buffer underrun, a position where the recording is interrupted can be set so as to be suitable for performing the recording resuming operation, namely, so as to be suitable for continuing signals to be recorded by the recording interrupting and resuming operation. However, when the recording operation is interrupted due to an applied external force, a position where the recording is interrupted cannot be set arbitrarily. Accordingly, it is difficult to maintain the continuity of recorded signals.

SUMMARY OF THE INVENTION

Accordingly, it is an object of the present invention to enable resumption of recording after the recording operation is interrupted due to an applied external force.

According to the present invention, upon resumption of recording, the recording is resumed from a position earlier to the position where the recording was interrupted. Consequently, the continuity of signals can be held.

DETAILED DESCRIPTION OF THE PREFERRED EMBODIMENT

Figure 1:
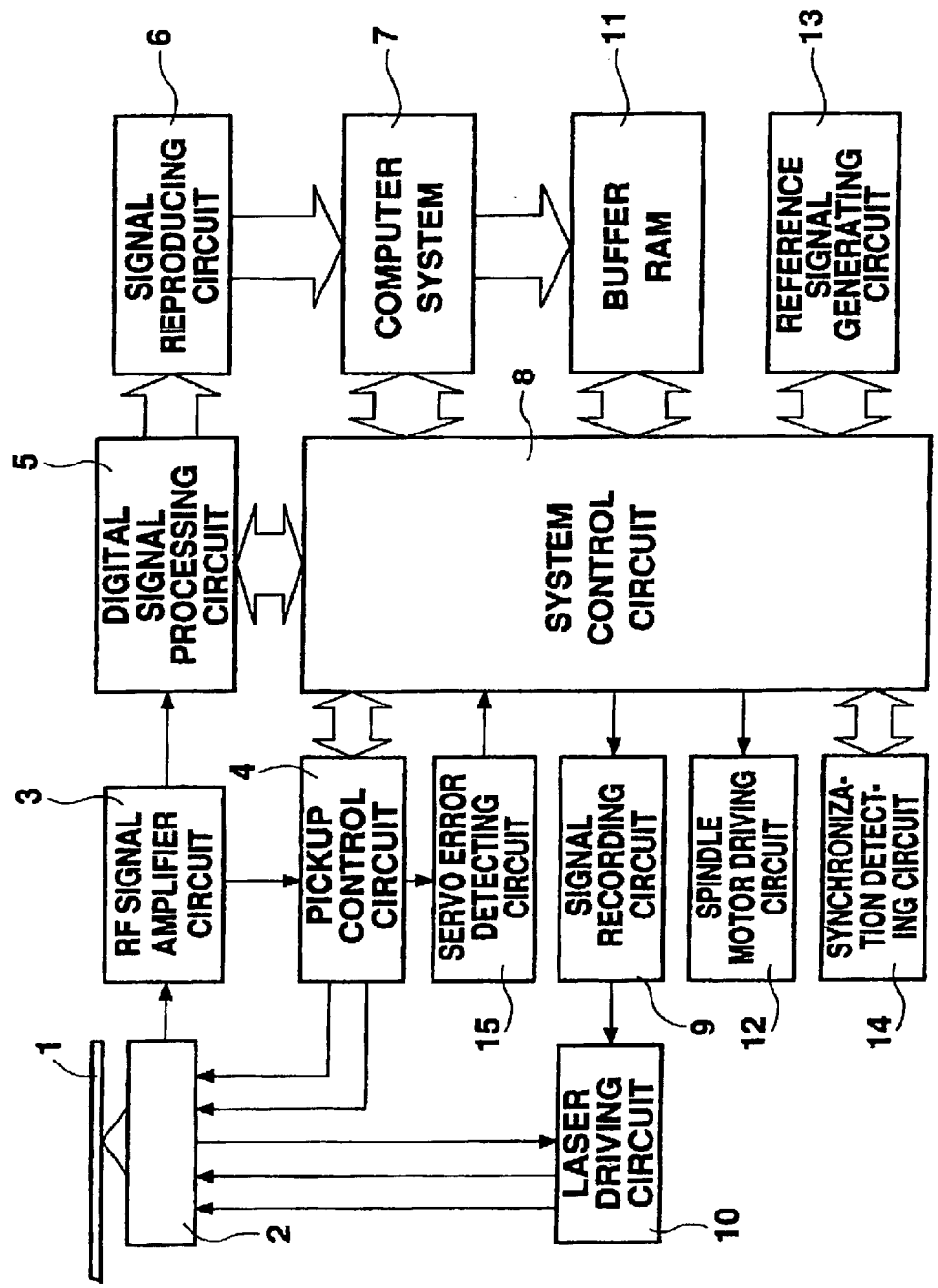
FIG. 1 is a block circuit diagram of an optical disk recording and reproducing apparatus.
Figure 2:
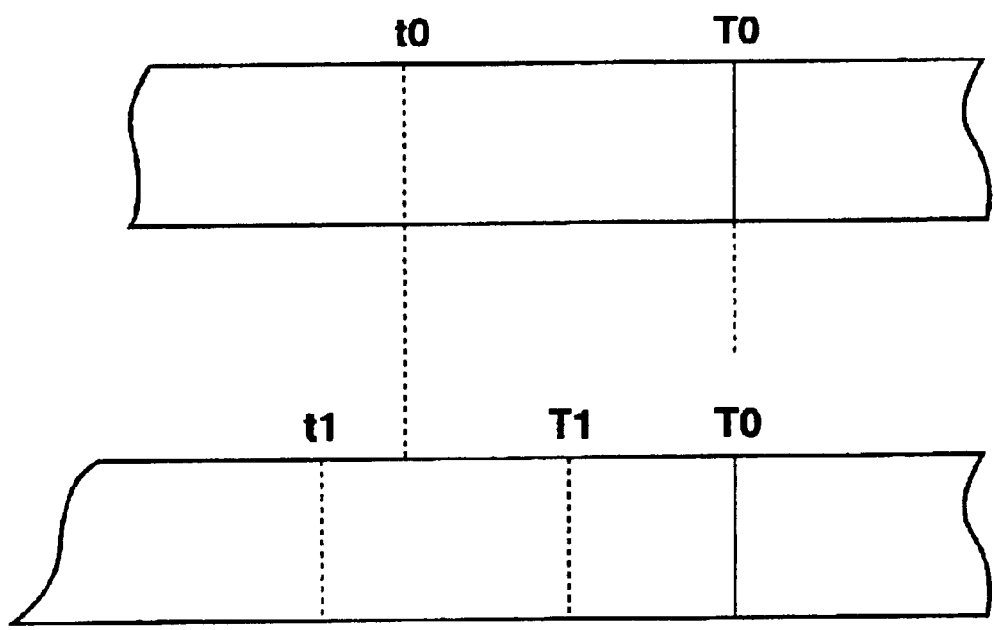
FIG. 2 is an explanatory diagram of the operation of the apparatus shown in FIG. 1.

FIG. 1 is a block circuit diagram of an optical disk recording and reproducing apparatus according to a preferred embodiment of the present invention. FIG. 2 is an explanatory diagram of the operation thereof.

Reference numeral 1 denotes a disk mounted on a turntable (not shown) which is rotated by a spindle motor. The disk is in turn rotated by the rotation of the turntable. In the disk 1, positional information data has been recorded using a groove called a wobble. The operation of recording or reproducing a signal is performed on the basis of a wobble signal obtained from the groove. An optical pickup 2 has a laser diode (not shown) for emitting focused beams of laser light (light beams) onto the disk 1, a monitor diode for monitoring the level of the light beams emitted from the laser diode, and a photodetector for receiving the light beams reflected by a signal surface of the disk 1. The optical pickup 2 is moved in the radial direction of the disk 1 by a pickup feed motor (not shown).

An RF signal amplifier circuit 3 amplifies an RF signal obtained from the photodetector built in the optical pickup 2 and also shapes a waveform of the signal. On the basis of a signal obtained through the RF signal amplifier circuit 3, a pickup control circuit 4 performs the focusing control operation of focusing the light beams emitted from the optical pickup 2 on the signal surface of the disk 1 and performs the tracking control operation of permitting the light beams to follow a signal track on the signal surface. The pickup control circuit 4 has a focus servo circuit and a tracking servo circuit therein.

A digital signal processing circuit 5 performs a digital signal processing to a signal outputted from the RF signal amplifier circuit 3 and also performs the operation of demodulating various kinds of signals. A signal reproducing circuit 6 is supplied with a digital signal processed by the digital signal processing circuit 5. When information recorded on the disk 1 is an audio signal, the signal reproducing circuit 6 converts an input signal into an analog signal and then outputs the signal to an amplifier or the like. When information recorded on the disk 1 is a computer software data signal, the signal reproducing circuit 6 outputs the raw digital signal to a computer system 7 provided as a host device.

A system control circuit 8 is supplied with a signal demodulated by the digital signal processing circuit 5 and also performs various control operations in accordance with instruction signals generated from the computer system 7. A signal recording circuit 9 is supplied with a recording signal such as a test signal or an information signal, and controls the laser irradiating operation of a laser driving circuit 10 in accordance with the supplied signal to record a data signal or the like onto the disk 1. The laser driving circuit 10 has a servo circuit for controlling a laser power on the basis of a signal obtained from the monitor diode built in the optical pickup 2.

A signal to be recorded onto the disk 1 is temporarily stored into a buffer RAM 11. A signal output from the computer system 7 is written into the buffer RAM 11. The control operation by the system control circuit 8 controls the operation of storing or reading a signal to/from the buffer RAM 11. When the signal stored in the buffer RAM 11 is read out to be recorded onto the disk 1, it also still remains stored and held in the buffer RAM 11. The held signal is only overwritten and erased when a new signal output from the computer system 7 is stored at a position corresponding to the held signal.

The system control circuit 8 controls the operation of a spindle motor driving circuit 12. The spindle motor driving circuit 12 controls the rotation of the spindle motor for rotating the disk 1 at a suitable speed for the recording or reproducing operation. A reference signal generating circuit 13 generates a recording reference signal to be used to record a signal onto the disk 1. A synchronization detecting circuit 14 detects whether a reference signal reproduced from the disk 1 is synchronized with the recording reference signal generated by the reference signal generating circuit 13. A servo error detecting circuit 15 detects a change in level of a servo signal obtained from the servo circuit built in the pickup control circuit 4, and detects whether the detected level exceeds a predetermined level, namely, an error detection level. The servo error detecting circuit 15 generates a detection output to the system control circuit 8.

In this configuration, in the operation of recording a signal onto the disk 1, a signal output from the computer system 7 is stored into the buffer RAM 11, and the operation of reading out the stored signal is controlled, thereby controlling the operation of recording the signal onto the disk 1. In a case wherein the recording operation is resumed after the operation of recording a signal onto the disk 1 is interrupted, the operation of comparing a signal stored and held in the buffer RAM 11 with the signal recorded on the disk 1 before interruption is performed, and a signal is recorded so as to follow the signal recorded before the interruption, a so-called seamless method.

During the signal recording operation on the disk 1, the address of the last position at which the normal recording operation was performed is stored into a memory circuit provided in the system control circuit 8. If the operation becomes a buffer underrun state in which the amount of recording signal data stored in the buffer RAM is insufficient upon the recording operation and the recording operation is interrupted, a signal can be recorded in a seamless manner from the position where the recording was interrupted on the basis of the last address stored in the memory circuit.

The optical disk recording and reproducing apparatus is constructed as described above. The reproducing operation will now be described. When the computer system 7 generates an instruction signal for the reproducing operation to the system control circuit 8 constructing a drive, the system control circuit 8 starts the control operation for the reproducing operation. When the reproducing operation is performed, the laser driving circuit 10 supplies driving current, from which a laser power for the signal reading operation is derived, to the laser diode built in the optical pickup 2.

When the control operation for the reproducing operation is started, the spindle motor driving circuit 12 performs the rotation control operation of the spindle motor. The rotation control operation of the spindle motor is performed in such a manner that a synchronization signal obtained by decoding the wobble signal is compared with the reference signal generated from a reference signal generating circuit (not shown) included in the system control circuit 8, thereby rotating the disk 1 at a fixed linear speed. The rotation control operation of the spindle motor is similarly performed during the signal recording operation, as will be described later.

The rotation control operation of the spindle motor is performed as described above. For the optical pickup 2 for performing the signal reading operation, the pickup control circuit 4 starts the focusing control operation and the tracking control operation. Accordingly, the optical pickup 2 starts the operation of reading a signal from the disk 1. TOC data recorded in a read-in area constructing a first session of the disk 1 is read out before the reproducing operation.

The reading and reproducing operation of a signal, which is recorded on the disk 1 and is recorded in a signal recording area of the first session, is performed on the basis of the TOC data recorded in the read-in area. The signal read out by the optical pickup 2 is amplified and waveform-shaped by the RF signal amplifier circuit 3. Next, the resultant signal is supplied to the digital signal processing circuit 5 and is then subjected to the demodulating operation. When the digital signal processing circuit 5 processes the signal to extract information data, the information data is subjected to a signal processing such as error correction and the resultant data is then supplied to the signal reproducing circuit 6.

When the information data read from the disk 1 is an audio signal, the signal reproducing circuit 6 converts the signal into an analog signal and then feeds the analog signal to an amplifier or the like. When the information data is a data signal of computer software, the signal reproducing circuit 6 outputs the signal that is digital as it is to the computer system 7.

The reproducing operation is performed as described above. The operation of recording a signal onto the disk 1 will now be described.

For the signal recording operation on the disk 1, a test signal is recorded in a trial writing area formed on the disk 1, thereby performing an operation of setting the optimum laser power suitable for the characteristics of the disk 1. The setting operation is performed by recording the test signal and also reproducing the recorded signal while the laser power is being changed. Because this type of operation is well-known, specific description will not be provided herein.

After the operation of setting the laser power, information data recorded in an area called a buffer of the disk 1, specifically positional information of a signal recorded in a signal recording area, is read out. On the basis of the information data read out as mentioned above, whether a data signal can be recorded in the signal recording area disposed on the disk 1 and where the recording operation is performed are recognized.

When the above recognition processing operation is completed, the optical pickup 2 is moved to a position where the recording operation on the disk 1 is to begin, and the operation of writing a recording signal into the buffer RAM 11 is performed. When the operation of writing signals into the buffer RAM 11 is performed, the amount of signal data stored in the buffer RAM 11 is gradually increased. When the amount of stored signal data exceeds a predetermined amount, a signal stored in the buffer RAM 11 is read out and the read-out signal is supplied to the signal recording circuit 9. Consequently, the signal recording circuit 9 controls the laser driving circuit 10, so that a signal is recorded onto the disk 1.

The signal recording operation on the disk 1 is performed in this manner. The operation of writing a signal in the buffer RAM 11 is performed in accordance with the operation of reading a signal from the buffer RAM 11. In such a state that the recording operation is normally performed, an address indicating a position where the recording position is normally performed, namely, the last address is stored into the memory circuit each time the operation of recording a signal onto the disk 1 is performed.

During the signal recording operation on the disk 1, when the amount of signal data to be output from the computer system 7 and be then written into the buffer RAM 11 is smaller than the amount of signal data read from the buffer RAM 11 for recording onto the disk 1, the amount of recording signal data stored in the buffer RAM 11 is gradually reduced. When the amount of recording signal data stored in the buffer RAM 11 is reduced and is then equivalent to a predetermined amount, in other words is in the buffer underrun state, the control operation of interrupting the recording operation on the disk 1 is performed. When the interrupting operation is performed, the operation of reading a signal from the buffer RAM 11 is also interrupted.

In the above state, when a recording signal is output from the computer system 7, the control operation of writing the recording signal into the buffer RAM 11 is performed. Thus, the amount of recording signal data stored in the buffer RAM 11 is gradually increased. When the amount of recording signal data stored in the buffer RAM 11 is increased and then reaches the predetermined amount, the control operation is performed in order to resume the recording operation.

The recording resuming operation is performed as follows. First, the optical pickup 2 is displaced to a position where the recording operation is started, a position prior to the position where the recording operation was interrupted. This is a position where recording has been performed. Next, the reproducing operation is performed from the position. The position where the recording is interrupted can be easily recognized from last address information stored in the memory circuit each time the normal recording operation is performed.

A signal to be reproduced by the reproducing operation is a signal recorded just before the interruption of the recording operation. The reproduced signal is compared with a signal stored and held in the buffer RAM 11. In the comparing operation, if it is determined that the signals coincides with each other, a signal, which has been stored in the buffer RAM 11 and has also been stored subsequent to the signal serving as a target of the above-mentioned comparing operation, is read out. The read-out signal is then supplied to the signal recording circuit 9, thereby starting the operation of recording the signal onto the disk 1. As a result of the above operation, the operation of interrupting recording of a signal on the disk 1 and then resuming the recording can be performed. The above operation accomplishes the operation of continuously recording signals irrespective of the interruption of the recording operation, namely, seamless recording on the disk 1.

As mentioned above, the operation of controlling signals is performed during the recording interrupting and resuming operation. Subsequently, the control operation in order to resume the recording operation from a position where the recording is interrupted will now be described. In the control operation, the operation of reading signals recorded on the disk 1 before the interruption is performed, and a reference signal is then detected from the read-out signals. On the other hand, a recording reference signal generated by the reference signal generating circuit 13 is synchronized with the above reference signal, namely, the reference signal obtained from the disk 1. That is, the synchronization processing operation is performed. The synchronization detecting circuit 14 detects whether the reference signals are synchronized with each other, said detection accompanying the synchronization processing operation.

If the synchronization detecting circuit 14 detects the synchronization of the reference signals, the recording operation on the disk 1 is started so long as the number of frames constructing the recording signal reaches the predetermined number after the synchronization. The number of frames is set in consideration of the position where the recording was interrupted and time required until the processing operation for recording start is completed. After the synchronization, the synchronization detecting circuit 14 detects whether or not the recording reference signal generated by the reference signal generating circuit 13 is out of synchronization with the reference signal obtained from the disk 1. When it is determined that the recording reference signal is not out of synchronization with the reference signal, the recording operation is resumed.

The recording interrupting and resuming operation performed in the buffer underrun state in which the amount of recording signal data stored in the buffer RAM 11 is insufficient is performed as mentioned above. The operation will now be described with reference to FIG. 2. Referring to FIG. 2, a point T0 denotes a position at which the recording operation is interrupted because a buffer underrun state is detected. A point t0 denotes a position where the operation of reading a signal is started by the processing operation of resuming the recording operation. At the point t0, the operation of comparing the read-out signal with a signal stored in the buffer RAM 11 or the operation of comparing the read-out signal with the reference signal is started. The comparison processing operation is performed and the recording operation is then resumed at the point T0. The recording resuming operation is performed, so that seamless recording can be performed.

Preferably, the position t0 is set as a preset time earlier than the point T0. The preset time is determined in accordance with time required for the processing of resuming the recording operation. For example, the preset time may be set to about 0.5 seconds.

When the number of frames for one second is equal to 75 frames, the number of frames in 0.5 seconds would be equal to 38 frames. A frame in this case is not an EFM frame, but a frame equal to 98 EFM frames. Such a frame is also referred to as a block.

When the position t0 is set to 0.5 seconds, the number of frames varies depending on recording speed. For example, for a speed P, the position t0 is located before the point T0 by 38×P frames.

The position t0 can be set in accordance with the number of frames. In this case, the number of frames may be set in accordance with recording speed.

When during the recording operation the optical disk recording and reproducing apparatus is jarred or somehow receives an externally imparted force, the level of a tracking servo signal drastically increases in association with the servo operation by the pickup control circuit 4. The signal is called a tracking error signal. The servo error detecting circuit 15 detects a change in level of the tracking servo signal.

When the servo error detecting circuit 15 detects that the level of the servo signal exceeds an error detection level, a detection output of the circuit 15 is supplied to the system control circuit 8. When the detection output of the servo error detecting circuit 15 is input to the system control circuit 8, the system control circuit 8 determines that it is in such a state that the recording operation cannot be continued normally, then performs the processing operation of interrupting the recording operation, and also stores an address indicating a position of the interruption.

When the recording interrupting operation is performed as described above, the control operation for recording resumption is started. The control operation is performed as follows. First, the optical pickup 2 is displaced to a position that is backspaced from the position at which the recording was interrupted. Then, the reproducing operation is started from this position. The position where the recording is interrupted can be easily determined from information of the last address stored in the memory circuit each time the normal recording operation is performed. Accordingly, the optical pickup 2 can be moved to a desired position. When the optical pickup 2 is moved to the desired position, the pickup control circuit 4 performs the control operation. Then, the operation of reproducing a signal recorded on the disk 1 can be performed.

The signal reproduced by the reproducing operation is a signal recorded just prior to the interruption of the recording operation. The reproduced signal is compared with a signal stored in the buffer RAM 11. In the comparison operation, if it is determined that the signals coincide with each other, a signal which has been stored in the buffer RAM 11 and subsequent to the signal serving as a target of the above-mentioned comparing operation is read out. The read-out signal is supplied to the signal recording circuit 9. Then, the signal recording operation on the disk 1 is started. As a result of the above operation, the operation of interrupting recording of a signal on the disk 1 and then resuming the recording can be performed. The above operation accomplishes the operation of continuously recording signals irrespective of the interruption of the recording operation, namely, the seamless recording operation on the disk 1.

As described above, when the recording operation is interrupted by the external force (shock), the recording resuming operation is performed. This operation will now be described with reference to FIG. 2. Referring to FIG. 2, the point T0 denotes a position at which the recording operation is interrupted by detecting an external force. A point t1 denotes a position where the signal reading operation is started by the processing operation of resuming the recording operation. The point t1 is set to a position that is backspaced farther than the point t0 (the temporally preceding position) where the signal reading operation is performed in the recording interrupting and resuming operation upon buffer underrun. Point t1 is backspaced farther than the point t0 because, as a result of the influence of the external force, the reliability of the signals recorded up to the point T0 can not be assured.

When the operation of reading signals recorded from the point t1 is started, the operation of comparing the read-out signal with a signal stored in the buffer RAM 11, or the processing operation of comparing the read-out signal with the reference signal is performed and the recording operation is then resumed. The recording resuming operation is performed not from the point T0 where the recording is interrupted, but from the point T1 slightly prior to the point T0. When the recording operation is started from the point T1, duplicate signals are recorded from the point T1 to the point T0 because the signals recorded between these points are most affected by the external force.

As described above, according to the present invention, when the recording interrupting operation is performed, the position where the recording resuming operation is started is set to not the position T0 where the recording is interrupted, but the position T1 just before the position T0. Accordingly, the recording operation can be accomplished without deteriorating the continuity of signals. The distance between the points T1 and T0 is set so as to be equivalent to an error correctable range of a reproduced signal. In other words, in the setting as described above, even when the characteristics of the signals recorded between the points T1 and T0 are deteriorated, the error correction processing can be performed using the signal recorded from the point T0 and the signals recorded before the point T0. Consequently, even when the recording operation is interrupted by the external force, the recording resuming operation can be performed without obstructing the reproducing operation.

In this instance, the period between the points t1 and T1 is the time required for the processing of resuming the recording operation. Preferably, the period between the points t1 and T1 is equivalent to the period between the points t0 and T0. However, as long as a period sufficient for the processing can be secured, the periods may differ.

As noted above, when the period between the points t1 and T1 is equivalent to the period between the points t0 and T0, a period between the points t0 and t1 is equivalent to a period between the points T1 and T0. Both the period between the points t0 and t1 and the period between the points T1 and T0 is set within the error correctable range. According to the present disk recording standard, the error correctable range is set to six EFM frames. Then, the period between the points t0 and t1 or the period between the points T1 and T0 may be set to several EFM frames within six EFM frames. Consequently, even when data to be written from the point T0 is written from the point T1, corrections can be made and signal continuity can be maintained and assured.

The error correction capability is determined by the disk standard. Accordingly, when the standard is changed, the period between the points t0 and t1 or the period between the points T1 and T0 may be changed.

Recorded data is compared with data recorded in the buffer RAM 11 for the period between the points t1 and T1. Because data recorded on the disk between the points T1 and T0 may not be correct, the comparison is not performed for the period between the points T1 and T0.

What is claimed is:

1. An optical disk recording and reproducing apparatus which records a signal onto or reproduces a signal from an optical disk, comprising:

a buffer which temporarily stores a recording signal;

a signal recording circuit which records a signal read from the buffer onto the optical disk; and an error detecting circuit which detects a recording error caused by an externally applied force during recording by the signal recording circuit, wherein the signal recording circuit interrupts the recording of a signal when the error detecting circuit detects an error, reproduces a signal which has already been recorded on the optical disk, records the recording signal stored in the buffer onto the optical disk synchronously with the reproduced signal to resume the recording of the recording signal, and resumes the recording from a position that is prior to a position at which the recording was interrupted and overwrites a predetermined amount of recording signal data when the recording of the recording signal is resumed.

2. The apparatus according to claim 1, wherein the error detecting circuit detects a recording error based on the external force on the basis of a servo error signal obtained by a pickup control circuit which controls the operation of a pickup for recording or reproducing a signal onto or from the optical disk.

3. The apparatus according to claim 1, wherein the predetermined amount of recording signal data to be overwritten is set within a range where an error regarding the recording signal can be corrected.

4. The apparatus according to claim 3, wherein the predetermined amount of recording signal data to be overwritten is set within six EFM frames.

5. The apparatus according to claim 1, wherein when buffer underrun is detected because the amount of recording data stored in the buffer is less than or equal to a predetermined value, the signal recording circuit halts the recording of the recording signal onto the disk and, when the amount of recording signal data stored in the buffer is greater than or equal to the predetermined value, the signal recording circuit permits a signal which has already been recorded on the optical disk to be reproduced and the recording signal stored in the buffer to be recorded onto the optical disk synchronously with the reproduced signal, thereby resuming the recording of the recording signal, the recording being resumed from a position at which the recording was interrupted, without overwriting.

6. The apparatus according to claim 5, wherein when the recording is interrupted by an external force, the signal recording circuit starts reproduction from a position prior to the position at which the recording was interrupted by the buffer underrun.

* * * * *